US010625810B2

(12) United States Patent
Schreiber et al.

(10) Patent No.: US 10,625,810 B2
(45) Date of Patent: Apr. 21, 2020

(54) MOTORCYCLE MOUNTING ASSEMBLY FOR RADIO HANDSET MICROPHONES

(71) Applicant: Innovative Products Inc., Knoxville, TN (US)

(72) Inventors: Bryan J. Schreiber, Knoxville, TN (US); Michael J. Tinter, Hudson, OH (US)

(73) Assignee: Innovative Products, Inc., Knoxville, TN (US)

( * ) Notice: Subject to any disclaimer, the term of this patent is extended or adjusted under 35 U.S.C. 154(b) by 0 days.

(21) Appl. No.: 15/160,351

(22) Filed: May 20, 2016

(65) Prior Publication Data

US 2017/0334499 A1  Nov. 23, 2017

(51) Int. Cl.
*B62J 99/00* (2020.01)
*B62K 11/14* (2006.01)

(52) U.S. Cl.
CPC ....... *B62K 11/14* (2013.01); *B62J 2099/0006* (2013.01)

(58) Field of Classification Search
CPC .... B62J 99/00; B62J 2099/0006; B62K 23/02
USPC ........................................................ 224/413
See application file for complete search history.

(56) References Cited

U.S. PATENT DOCUMENTS

| 4,058,357 A | 11/1977 | Wallace |
| 4,319,097 A | 3/1982 | Liataud |
| 4,662,547 A * | 5/1987 | Villanueva ............... B62J 11/00 224/418 |
| 4,974,759 A * | 12/1990 | McDonough ............ B62J 11/00 224/420 |
| 5,109,411 A * | 4/1992 | O'Connell .......... B60R 11/0241 224/553 |
| 5,221,929 A | 6/1993 | Ott |
| 5,406,816 A * | 4/1995 | Thomas ..................... B62J 7/06 224/414 |
| 3,244,981 A | 4/1996 | Der Tatevasian |
| 5,605,145 A | 2/1997 | Hannah et al. |
| 6,149,116 A | 11/2000 | Won |
| 6,288,684 B1 | 9/2001 | Wiggenhorn et al. |
| 8,627,990 B2 * | 1/2014 | Nakajima ................ B62J 9/008 224/420 |
| 9,773,601 B2 | 9/2017 | Breiwa et al. |
| 2004/0132509 A1 | 7/2004 | Glezerman |

(Continued)

*Primary Examiner* — Derek J Battisti
(74) *Attorney, Agent, or Firm* — Warner Norcross Judd + LLP

(57) ABSTRACT

A mounting assembly for releasably securing a radio handset microphone to a motorcycle handlebar is provided. The mounting assembly includes a bracket element to extend partially around a motorcycle handlebar and a rigid plate extending from the bracket element. The bracket element is adapted to be joined to the motorcycle handlebar such that the bracket element partially surrounds the motorcycle handlebar. The rigid plate includes a mounting surface for mounting a radio handset microphone thereto. The mounting surface generally extends over the handlebar and is easily accessible to the motorcycle occupant. The mounting assembly may be combined with a carrier and a handset adapter to provide a mounting system with a secure landing zone that firmly holds the radio handset microphone in place.

9 Claims, 6 Drawing Sheets

(56) References Cited

U.S. PATENT DOCUMENTS

| | | | |
|---|---|---|---|
| 2004/0232291 A1* | 11/2004 | Carnevali | F16M 13/00 |
| | | | 248/206.5 |
| 2007/0093279 A1 | 4/2007 | Janik | |
| 2007/0172079 A1 | 7/2007 | Christoph | |
| 2008/0164267 A1 | 7/2008 | Huber | |
| 2008/0311966 A1 | 12/2008 | Klein | |
| 2009/0116678 A1 | 5/2009 | Bevirt et al. | |
| 2012/0275633 A1 | 11/2012 | Schreiber et al. | |
| 2013/0098959 A1* | 4/2013 | Onogi | B62J 11/00 |
| | | | 224/419 |
| 2014/0175139 A1* | 6/2014 | Pereira | B60N 3/103 |
| | | | 224/545 |
| 2015/0183478 A1* | 7/2015 | Tate | B62J 11/00 |
| | | | 224/441 |
| 2015/0305461 A1* | 10/2015 | Su | G06F 1/1628 |
| | | | 224/191 |
| 2016/0039485 A1* | 2/2016 | Esquibel | B62K 19/30 |
| | | | 224/420 |

\* cited by examiner

MOTORCYCLE MOUNTING ASSEMBLY FOR RADIO HANDSET MICROPHONES

FIELD OF THE INVENTION

The present invention relates to a mounting assembly for radio microphones, and in particular, a motorcycle mounting assembly for radio handset microphones.

BACKGROUND OF THE INVENTION

Radio handset microphones have traditionally been attached to a mounting device using a clip assembly. The clip assembly can include a tongue and groove attachment. The tongue and groove attachment requires alignment of a tongue with a groove in the mounting device. However, the tongue and groove attachment can require users to concentrate on removing or replacing the handset rather than concentrating on driving. This is particularly problematic in motorcycles, which can demand a higher level of concentration than four wheeled vehicles. Accordingly, there remains a continued need for an improved system for safely and efficiently mounting a radio handset microphone to a motorcycle in a manner that is easily retrievable. In particular, there remains a continued need for an improved system for releasably mounting existing radio handset microphones without requiring complex or costly modifications to the motorcycle or to the radio handset microphone.

SUMMARY OF THE INVENTION

A mounting assembly for releasably securing a radio handset microphone to a motorcycle handlebar is provided. According to one embodiment, the mounting assembly includes a bracket element to extend partially around the handlebar and a plate element extending from the bracket element. The bracket element can be adapted for attachment across the handlebar, and the plate element can include a mounting surface for supporting a radio handset microphone. The mounting surface extends over the handlebar and faces the occupant for convenient access to the radio handset microphone.

According to another embodiment, the bracket element includes an engagement surface adapted to conform to the outer periphery of the motorcycle handlebar. The bracket element also includes first and second through holes aligned with first and second apertures in a half-body, optionally a brake fluid container half-body or a switch case half-body. The plate element extends from the bracket element over the motorcycle handlebar generally inwardly and toward the longitudinal centerline of the motorcycle. The plate element includes a first fastener aperture, a second fastener aperture, and a grounding through hole. The first fastener aperture and the second fastener aperture are spaced apart from each other and positioned outwardly of the grounding through hole. The bracket element and the plate element can be formed of a magnetic material to prevent undesired interference to nearby electrical switches.

In various embodiments, the mounting assembly may be combined with a magnetic carrier and a handset adapter to provide a mounting system with a secure landing zone that firmly holds the radio handset microphone with a uniform force. The mounting system can provide an effective conversion kit that can be sold as an after-market kit for radio handset microphones having a traditional tongue and groove 'hang-up clip' mount. The mounting assembly can be easily fitted to a handlebar, optionally a motorcycle handle bar.

These and other advantages and features of the invention will be more fully understood and appreciated by reference to the drawings and the description of the current embodiments.

Before embodiments of the invention are explained in detail, it is to be understood that the invention is not limited to the details of operation or the details of construction and the arrangement of the components set forth in the following description or illustrated in the drawings. The invention may be implemented in various other embodiments and may be practiced or carried out in alternative ways not expressly disclosed herein. The use of "including" and "comprising" and variations thereof is meant to encompass the items listed thereafter and equivalents thereof, as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION OF THE CURRENT EMBODIMENTS

Figure 1:
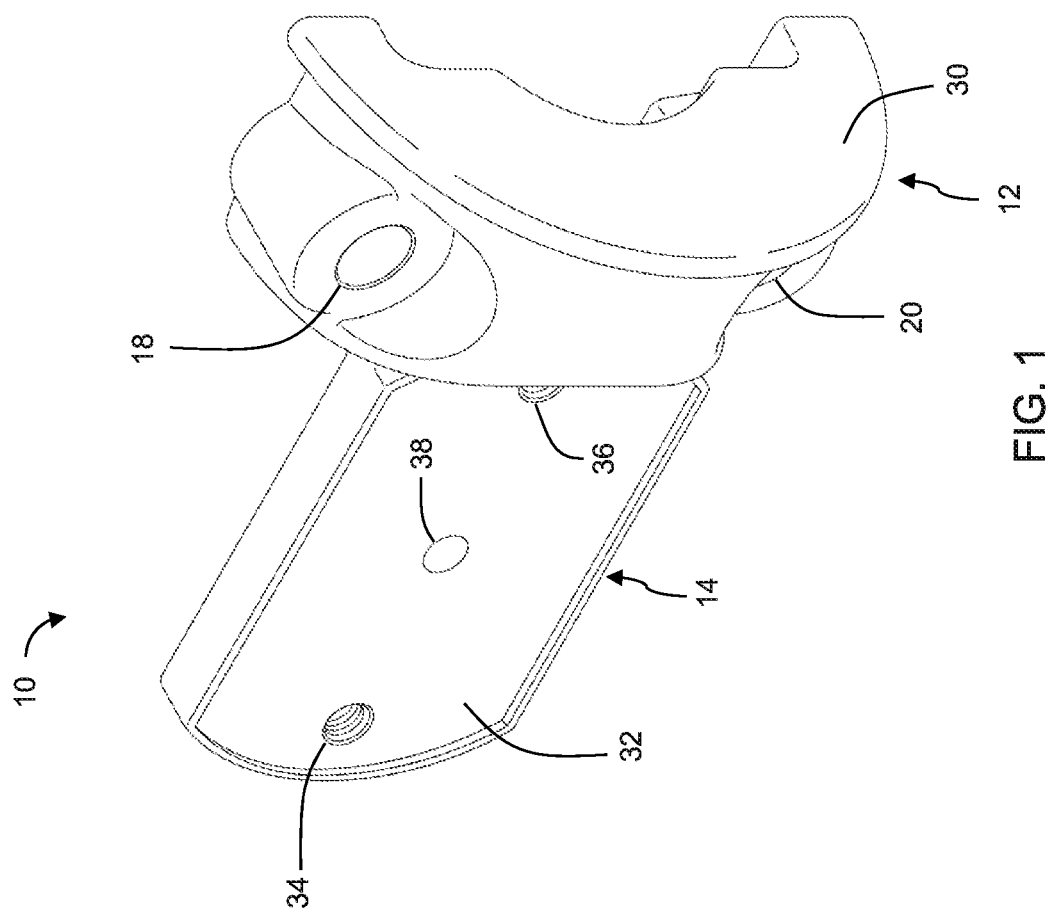
FIG. 1 is a perspective view of a mounting assembly in accordance with one embodiment.
Figure 2:
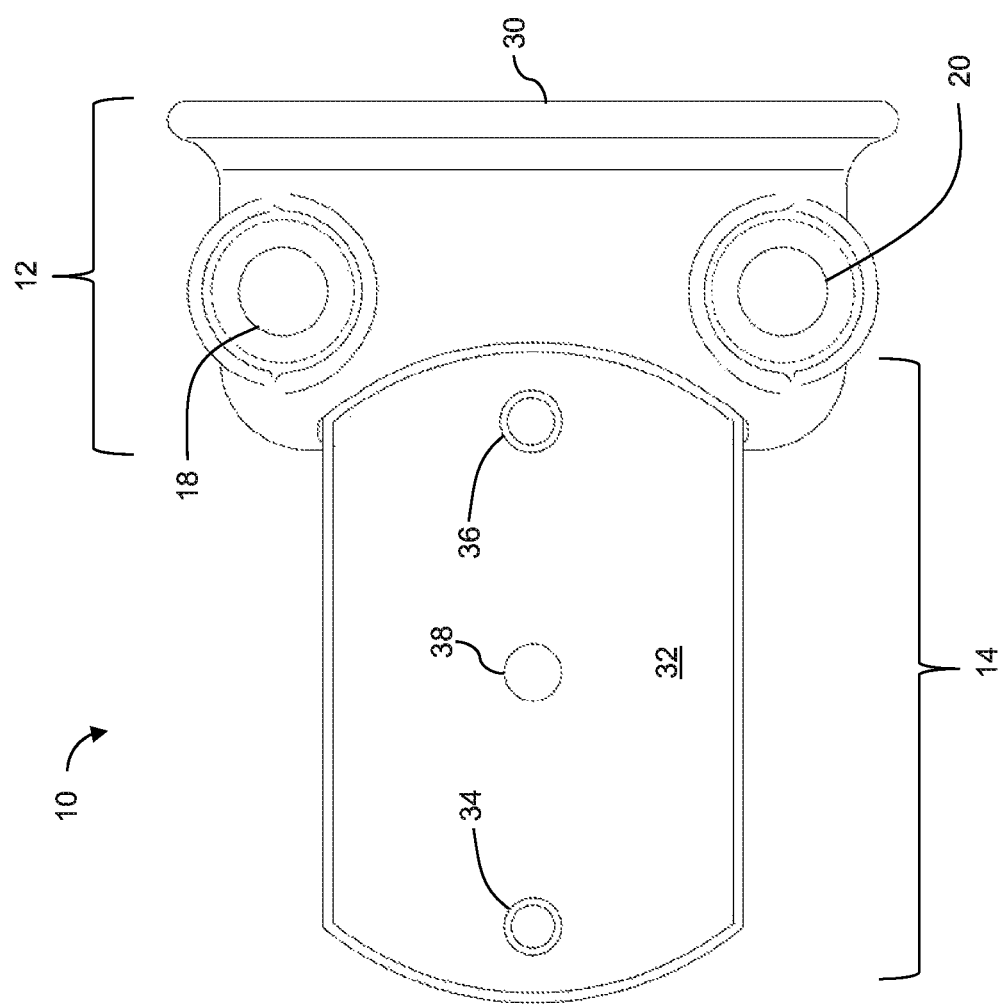
FIG. 2 is a front side elevation view of the mounting assembly of FIG. 1.

The embodiments as disclosed herein include a mounting assembly for releasably securing a radio handset microphone to a handlebar, for example a motorcycle handlebar. The mounting assembly can be combined with a magnetic carrier and a handset adaptor to provide a mounting system that firmly holds a radio handset microphone with a uniform force. The mounting assembly is well suited as an after-market kit for a radio handset microphone and can be installed with conventional hand tools, for example a hex key or a screwdriver.

A mounting assembly in accordance with one embodiment is depicted in FIGS. 1-4 and generally designated 10. The mounting assembly 10 includes a first portion 12 adapted to be joined to a handlebar and a second portion 14 extending from the first portion 12 for supporting one or more objects thereon. The first portion 12, referred to as a bracket element herein, extends partially around a handlebar for attachment to a half-body, sometimes referred to as a half clamshell. The half-body can be a preexisting handlebar component or can be added to a handlebar for attachment to the bracket element 12. The half-body can be joined to another component, for example a brake fluid container or a switch case, or can be a stand-alone component. The second portion 14, referred to as a plate element herein, includes a mounting surface for a carrier, for example a magnetic carrier for a handset adaptor. Each such element 12, 14 is discussed in greater detail below.

Figure 3:
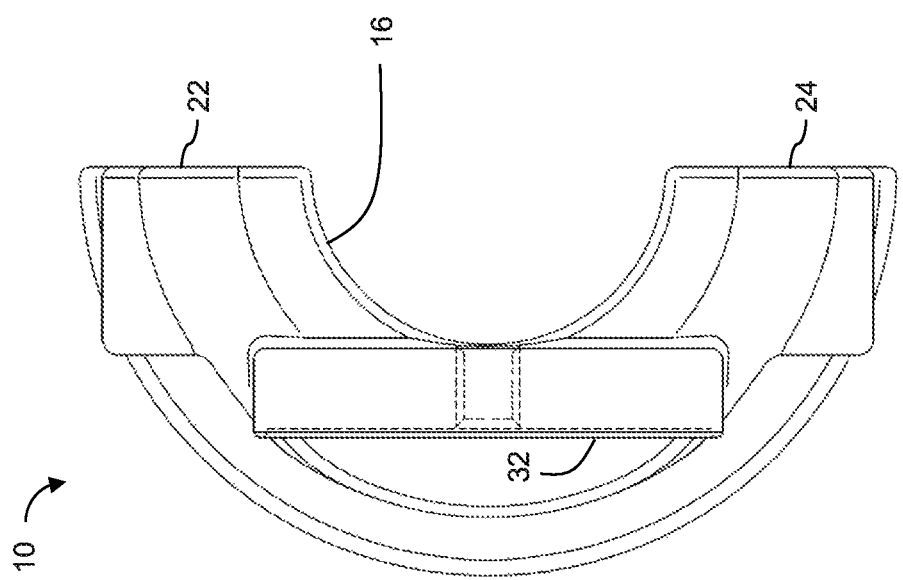
FIG. 3 is a left side elevation view of the mounting assembly of FIG. 1.
Figure 4:
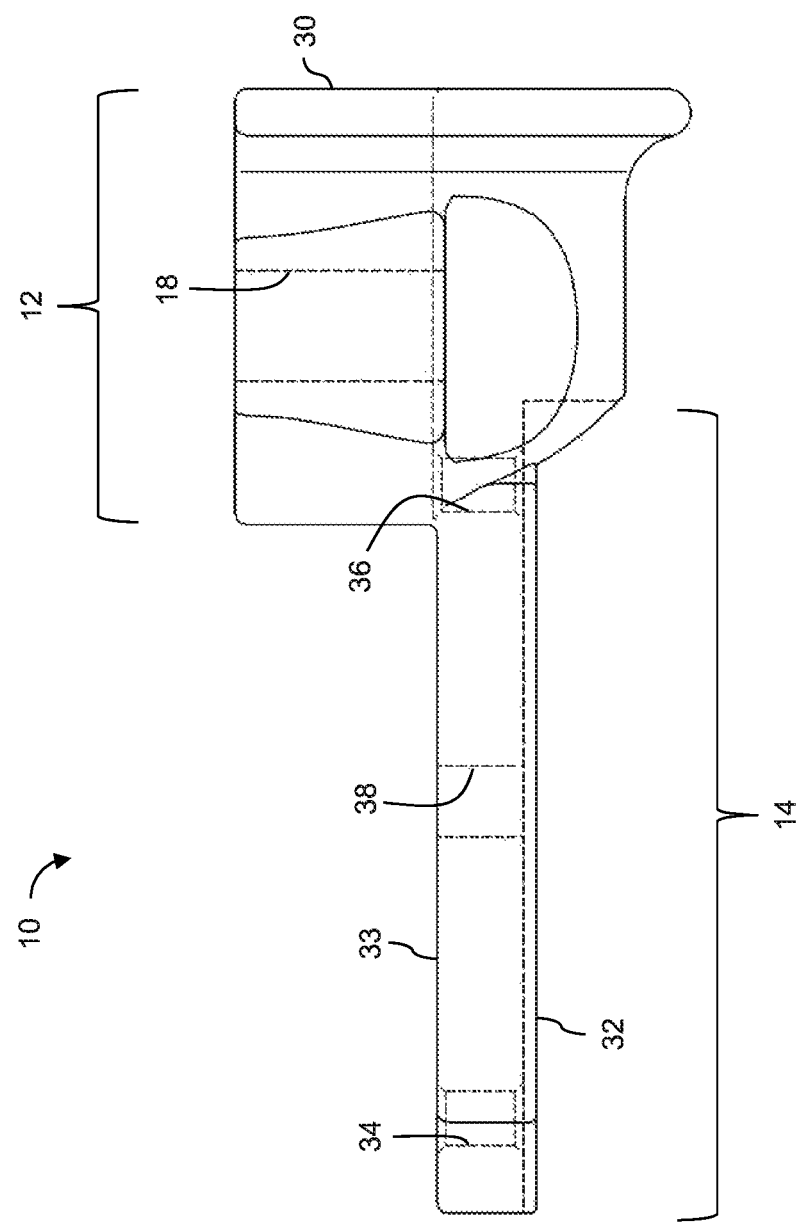
FIG. 4 is a top plan view of the mounting assembly of FIG. 1.

Referring again to FIGS. 1-4, the bracket element 12 includes an engagement surface 16 and first and second through holes 18, 20. The engagement surface 16 is curved in the illustrated embodiment to conform to the outer surface of a handlebar, generally following a semi-circle when viewed from the side as shown in FIG. 3. The engagement surface 16 can include other configurations in other embodiments as desired, for example where the handlebar does not include a tubular configuration. As also shown in FIG. 3, the bracket element 12 terminates in a first end portion 22 and a second end portion 24. The first through hole 18 extends through the first end portion 22 and the second through hole 20 extends through the second end portion 24. As discussed below in connection with FIGS. 5-6, the first and second through holes 18, 20 are positioned to receive first and second securing elements 26, 28 for attachment to a half-body. The securing elements 26, 28 can be any suitable element, including a hex key operated set screw threaded into the first and second through holes 18, 20. This type of fastener can allow quick and easy engagement and disengagement from the half-body. The bracket element 12 also includes a flat side surface 30 that is perpendicular to the plate element 14 for placement adjacent a switch case, for example.

As noted above, the plate element 14 extends from the bracket element 12 for supporting one or more objects thereon. In the illustrated embodiment, the plate element 14 is adapted to be cantilevered over a handlebar, for example a motorcycle handlebar, such that the back surface 33 abuts the handlebar. The plate element 14 includes a mounting surface 32 generally facing the motorcycle occupant. The mounting surface 32 includes a first fastener aperture 34, a second fastener aperture 36, and a grounding through hole 38. The first fastener aperture 34 and the second fastener aperture 36 are spaced apart from each other and positioned outwardly of the grounding through hole 38. Third and fourth securing elements 42, 44 secure the carrier 100 to the mounting assembly 10. The third and fourth securing elements 42, 44 can be any suitable element, including a screw threaded into the first and second apertures 34, 36. The plate element 14, though illustrated as being flat and rigid, can include essentially any configuration for mounting a carrier 100 thereto, including for example configurations that are curved or flexible.

The plate element 14 is integrally joined to the bracket element 12 in the illustrated embodiment, but can be formed separately from the bracket element 12 in other embodiments as desired. The plate element 14 and the bracket element 12 can be formed from any suitable material that is attracted by a magnet, i.e., magnetically permeable materials, including materials such as steel, iron, nickel and cobalt. In other embodiments, the plate element 14 and the bracket element 12 are formed from a material that is not attracted by a magnet, i.e., non-magnetically permeable materials, including aluminum. It should be noted that materials that are insufficiently magnetic or insufficiently magnetically permeable to function in the desired manner described in this application are considered to be non-magnetic and non-magnetically permeable. Further by example, the plate element 14 and the bracket element 12 can be formed from carbon steel with a black oxide finish to prevent corrosion.

Figure 5:
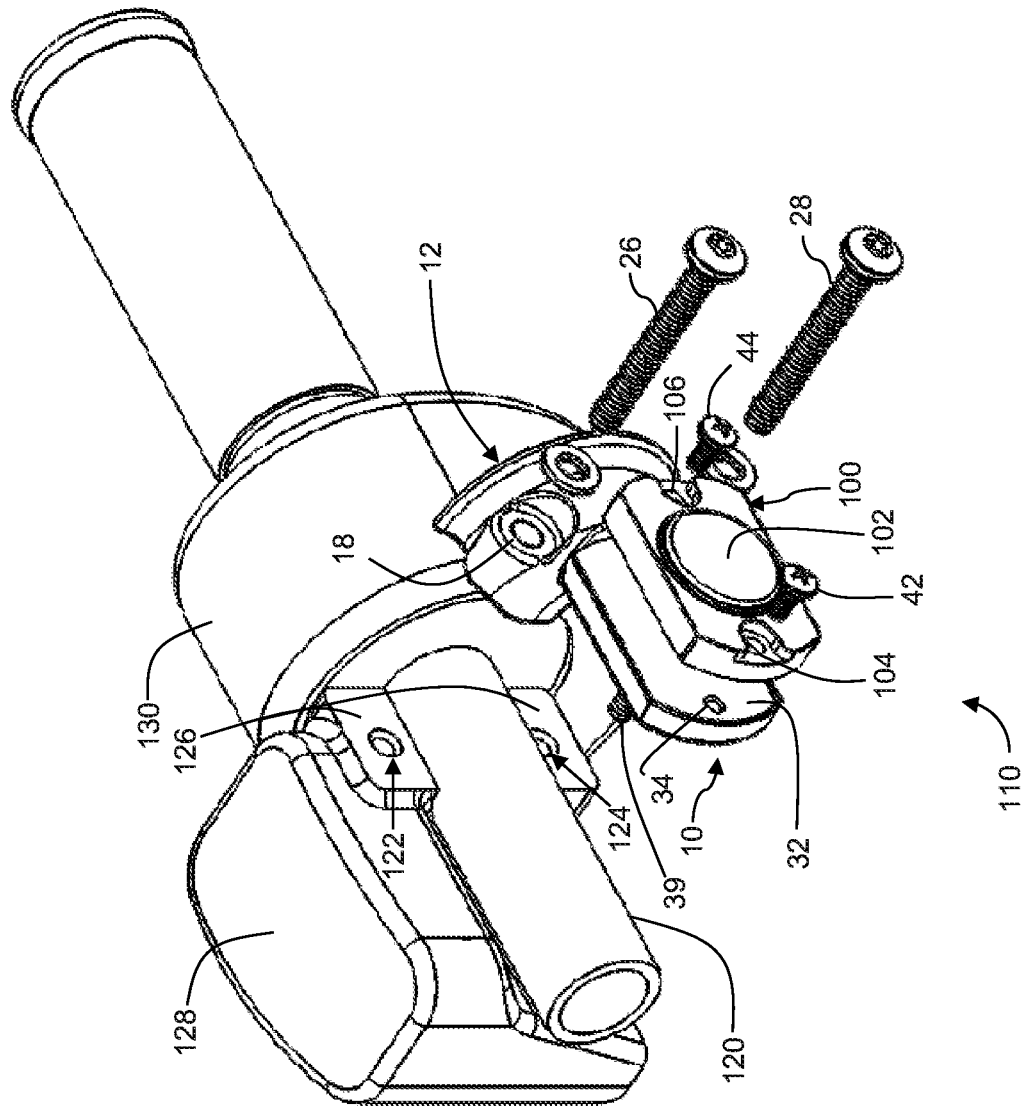
FIG. 5 is an exploded view of a mounting system including the mounting assembly of FIG. 1.
Figure 6:
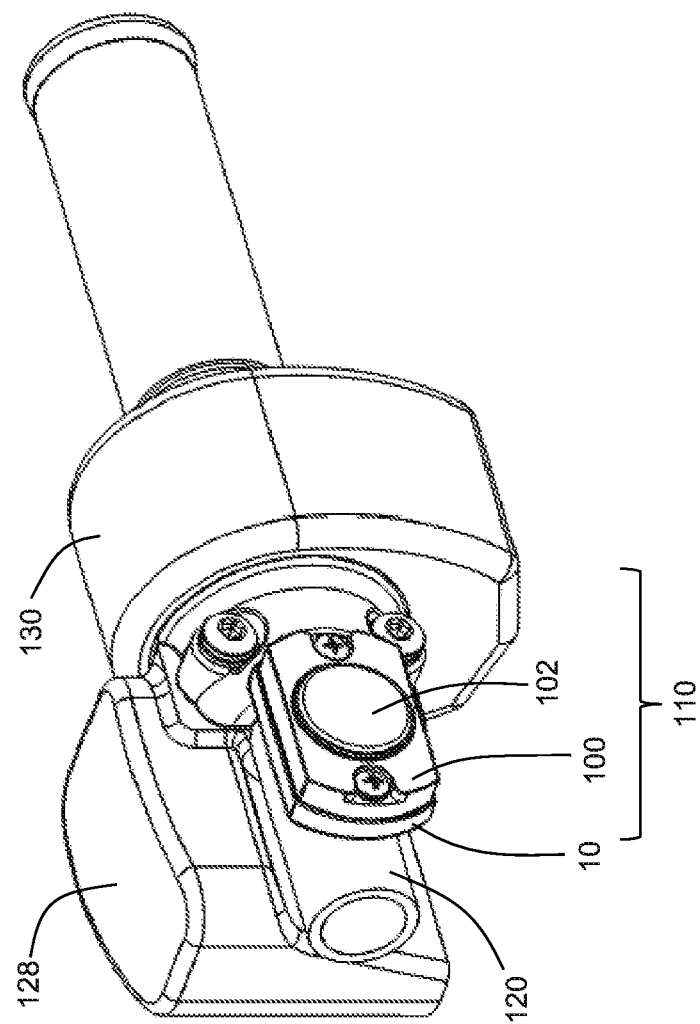
FIG. 6 is a perspective view of the mounting system of FIG. 5 including a magnetic carrier for attachment to a magnetic handset adaptor.

As noted above, the mounting assembly 10 includes a mounting surface 32 for attachment to a carrier 100, which together form a mounting system 110 as shown in FIGS. 5 and 6. The carrier 100 is as described in US Patent Application Publication 2012/0275633 to Schreiber et al entitled "Hang Up Magnet For Radio Telephone," the disclosure of which is incorporated by reference in its entirety. As shown in FIGS. 5 and 6 of the present application, for example, the carrier 100 provides a housing for a magnet 102. The magnet 102 may be attached to the carrier 100 using any suitable method, including a friction fit, an adhesive, or one or more fasteners. The magnet 102 may be any suitable size and shape, including disk shaped. The magnet may be made of any suitable magnet material, including neodymium and other alloys of rare earth elements. The magnet 102 is adapted to be joined to a magnetic handset adapter (not shown) substantially as described in the patent application publication referenced above and incorporated herein. For example, the magnet 102 can be axially polarized to provide a broader and more consistent landing zone for a magnetic handset adaptor. In this manner, the user may attach the handset adaptor (optionally including a magnet or a magnetic material) to the carrier 100 by bringing a handset adaptor in the general vicinity of the magnet 102.

The carrier 100 may be made from any suitable non-magnetic material, including aluminum with a flat black anodized non-conductive coating to prevent corrosion. The carrier 102 includes first and second carrier through holes 104, 106 for receipt of the third and fourth securing elements 42, 44 therethrough. The first and second through holes 104, 106 of the carrier 100 are in alignment with the first and second apertures 34, 36 of the plate element 14 when the carrier 100 is in stacked alignment with the plate element 14. In this regard, the outline of the plate element 14 matches that of the carrier 100, such that two are coextensive.

As noted above, the plate element 14 includes a grounding through hole 38 to provide a grounding path. An integral grounding path through the plate element 14 to the motorcycle handlebar allows the radio handset microphone to ground when the radio handset microphone is mounted to the mounting assembly 10. For example, an electrically conductive element 39 may be positioned within the grounding through hole 38 of the plate element 14 to connect the magnet 102 to ground (e.g., the motorcycle handlebar). The electrically conductive element 39 may be any suitable element, including an electrically conductive spring. In other embodiments however the plate element 14 does not include a grounding through hole 38. For example, the plate element 14 can be formed of a conductive material that is not magnetic. One such material includes uncoated aluminum. In this configuration, the plate element 14 can conduct to ground (e.g., the motorcycle handlebar) while isolating the magnetic field from the environment surrounding the mounting assembly 10.

To assemble the mounting system 110, the carrier 100 is placed over the mounting assembly 10 such that the through holes 104, 106 of the carrier 100 are in alignment with the corresponding apertures 34, 36 of the mounting assembly 10, being secured together using the third and fourth securing elements 42, 44. The mooting assembly 10, together with the carrier 100, is then placed over a motorcycle handlebar 120 such that the first and second through holes 18, 20 are aligned with existing apertures 122, 124 in a half-body 126. The half-body 126 can include any construction adapted to join the bracket element 14 to the handlebar 120. The half-body 126 is joined to a brake fluid container 128 adjacent to a switch case 130 as shown in FIG. 5, but can be separate from these components 126, 128 in other embodiments were desired. The first securing element 26 is inserted through the first through hole 18 and into the first half-body aperture 122, being tightened by a hand tool, optionally a hex key. The second securing element 28 is inserted through the second through hole 20 and into the second half-body aperture 124, also being tightened by a hand tool, optionally a hex key. Disassembly can be performed in the reverse order using the same hand tools used in the assembly of the mounting system 110.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to packages of any specific orientation(s). Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The invention claimed is:

1. A method for mounting a handset microphone to a motorcycle handlebar, the method comprising:

joining a bracket element to a half-clamshell of the motorcycle, the bracket element replacing a pre-existing component of the motorcycle and being adapted for attachment to the half-clamshell, wherein a mounting surface extends from the bracket element, such that such that the mounting surface is positioned within reach of a motorcycle occupant;

joining a handset adapter to the handset microphone, the handset microphone having a post and a tongue extending from the post, the handset adapter including at least one of a magnet and a magnetically attractable material that is disposed adjacent to an exterior-facing surface of the tongue when attached to the handset microphone; and bringing the handset microphone into proximity with the mounting surface to mount the handset microphone by magnetic attraction, wherein the mounting surface faces the motorcycle occupant and is between the motorcycle handlebar and the motorcycle occupant.

2. The method of claim 1 wherein the mounting surface includes a magnet joined thereto and wherein the handset adaptor includes a magnetically attractable material.

3. The method of claim 1 wherein the mounting surface includes a magnetically attractable material and wherein the handset adaptor includes a magnet.

4. The method of claim 1 wherein the mounting surface forms part of a plate element, the plate element being joined to a side portion of the bracket element.

5. The method of claim 4 wherein the plate element is cantilevered from the bracket element to extend over and parallel to the motorcycle handlebar.

6. The method of claim 1 wherein the bracket element includes a first fastener aperture and a second fastener aperture in alignment with a first threaded opening and a second threaded opening of the motorcycle half-clamshell, respectively.

7. The method of claim 1 wherein the bracket element includes a curved engagement surface adapted to conform to the outer periphery of a motorcycle handlebar.

8. The method of claim 1 wherein the bracket element and the mounting surface are formed of a magnetically permeable material.

9. The method of claim 1 wherein the bracket element and the mounting surface are formed of a non-magnetically permeable material.

\* \* \* \* \*